United States Patent [19]

Whitehead

[11] E Re. 31,211

[45] Reissued Apr. 19, 1983

[54] MAGNETICALLY CODED IDENTIFICATION CARD

[76] Inventor: Edwin N. Whitehead, 6208 Tally Ho La., Alexandria, Va. 22307

[21] Appl. No.: 349,444

[22] Filed: Feb. 17, 1982

Related U.S. Patent Documents

Reissue of:

[64] Patent No.: 4,253,017
Issued: Feb. 24, 1981
Appl. No.: 911,588
Filed: May 31, 1978

U.S. Applications:

[63] Continuation-in-part of Ser. No. 601,778, Aug. 4, 1975, and Ser. No. 487,757, Jul. 11, 1974, which is a continuation-in-part of Ser. No. 431,803, Jan. 8, 1974, abandoned, which is a continuation-in-part of Ser. No. 223,649, Feb. 4, 1972, abandoned.

[51] Int. Cl.[3] ..... G06K 7/08; G11B 5/38; B42D 15/00

[52] U.S. Cl. ..... 235/449; 235/450; 235/493; 283/75; 360/112

[58] Field of Search ..... 360/2, 21, 112, 131; 235/449, 450, 493; 283/7; 340/149 A, 152 R

[56] References Cited

U.S. PATENT DOCUMENTS

| | | | |
|---|---|---|---|
| 3,200,207 | 8/1965 | Rainer | 360/112 |
| 3,293,633 | 12/1966 | Gardenshire | 360/112 |
| 3,422,252 | 1/1969 | Cooper | 360/2 |
| 3,471,862 | 10/1969 | Barney | 360/2 |
| 3,474,430 | 10/1969 | Heissmeier | 360/112 |
| 3,634,656 | 1/1972 | Krechmer | 360/112 |
| 3,643,064 | 2/1972 | Hudson | 235/450 |
| 3,885,130 | 5/1975 | Moulton | 235/450 |
| 3,896,292 | 7/1975 | May | 235/450 |
| 4,081,132 | 3/1978 | Pearce | 235/450 |

*Primary Examiner*—Robert M. Kilgore
*Attorney, Agent, or Firm*—William D. Hall

[57] ABSTRACT

An identification card, comprising several laminated layers, one of which is of material capable of being magnetized, has 350 spots on it, each of which is capable of having one portion of the spot magnetized north and the other portion magnetized south. The 350 spots are divided into groups of randomly selected spots. One group, for example, represents the serial number of the card and has the portions of its spots magnetized accordingly. Apparatus for reading, and for remagnetizing the card to change the information recorded thereon, is also provided. This apparatus includes a horseshoe core (for each spot) that bridges the two magnetized portions of the spot. A "Hall effect" device detects the direction of the flux in said horseshoe core to respond to the direction of the magnetism of the portions of the spot. The polarity of the portions comprising the spot may be reversed by energizing a coil on the horseshoe core.

12 Claims, 7 Drawing Figures

FIG. 1.
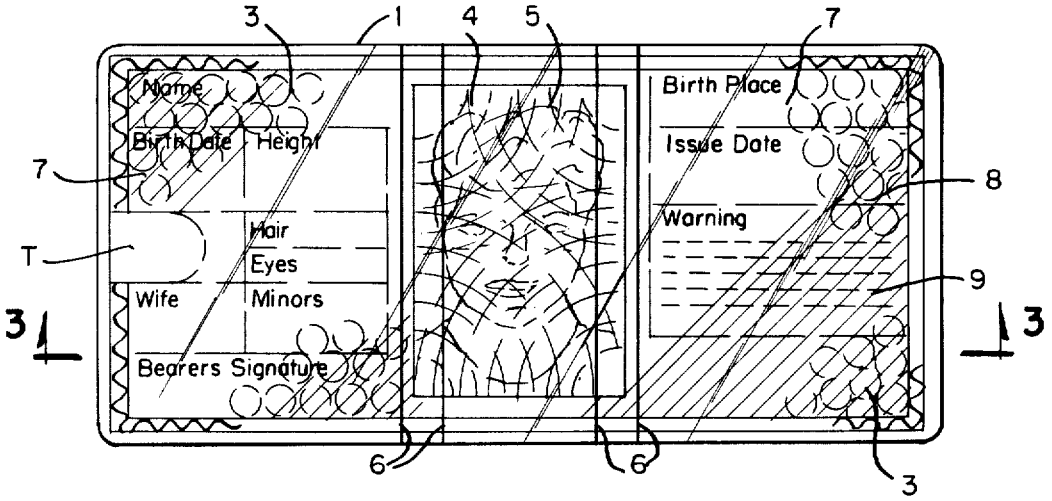
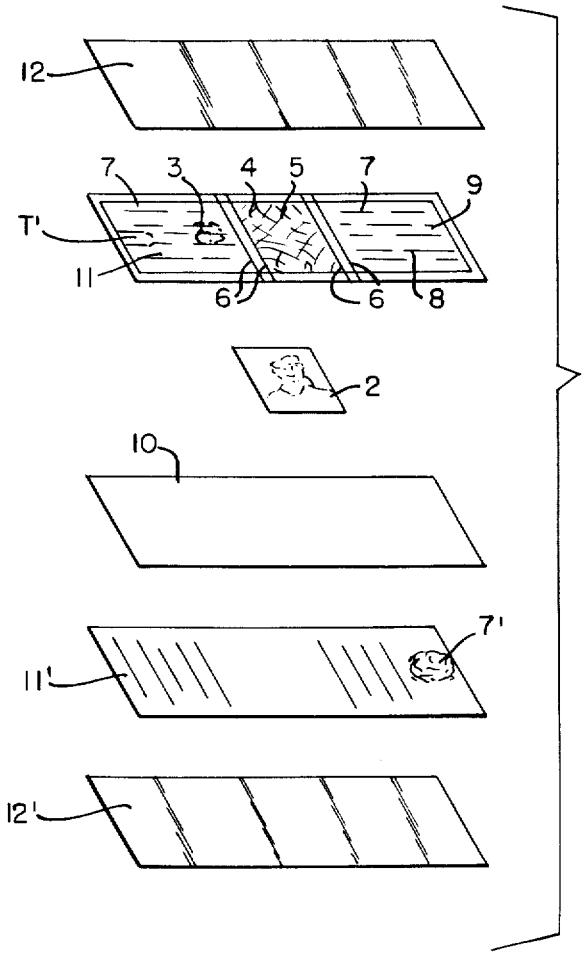
FIG. 2.

| | | | | | | | | | | | | | | | | | | | | | | | | |
|---|---|---|---|---|---|---|---|---|---|---|---|---|---|---|---|---|---|---|---|---|---|---|---|---|
| 5 | 5 | 8 | 6 | 4 | 8 | 6 | 4 | 9 | 0 | 3 | 0 | 5 | 3 | 5 | 8 | 4 | 8 | 4 | 8 | 0 | 1 | 5 | 1 | 7 |
| 7 | 3 | 2 | 4 | 7 | 0 | 9 | 3 | 7 | 4 | 1 | 5 | 3 | 5 | 2 | 5 | 6 | 3 | 8 | 0 | 6 | 5 | 9 | 9 | 2 |
| 3 | 1 | 4 | 1 | 5 | 5 | 0 | 9 | 5 | 1 | 0 | 2 | 2 | 9 | 4 | 1 | 3 | 0 | 5 | 5 | 2 | 0 | 2 | 5 | 6 |
| 1 | 0 | 1 | 5 | 1 | 3 | 2 | 7 | 0 | 3 | 8 | 7 | 9 | 0 | 0 | 0 | 9 | 6 | 0 | 1 | 5 | 9 | 8 | 2 | 9 |
| 4 | 8 | 7 | 9 | 0 | 7 | 5 | 0 | 8 | 6 | 5 | 9 | 7 | 1 | 7 | 7 | 7 | 1 | 2 | 9 | 9 | 7 | 7 | 7 | 1 |
| 0 | 6 | 0 | 7 | 8 | 4 | 3 | 2 | 1 | 5 | 9 | 4 | 4 | 4 | 1 | 4 | 1 | 4 | 6 | 6 | 1 | 2 | 4 | 4 | 5 |
| 6 | 4 | 6 | 0 | 3 | 2 | 1 | 5 | 4 | 9 | 6 | 6 | 0 | 2 | 3 | 3 | 5 | 9 | 3 | 4 | 7 | 6 | 1 | 8 | 8 |
| 2 | 2 | 3 | 2 | 6 | 9 | 8 | 8 | 2 | 7 | 3 | 3 | 6 | 6 | 8 | 9 | 0 | 7 | 9 | 2 | 3 | 3 | 0 | 6 | 4 |
| 8 | 9 | 9 | 8 | 9 | 6 | 7 | 1 | 6 | 2 | 2 | 1 | 1 | 8 | 6 | 6 | 8 | 2 | 7 | 7 | 8 | 8 | 6 | 3 | 0 |
| 3 | 1 | 4 | 1 | 5 | 5 | 0 | 9 | 5 | 1 | 0 | 2 | 2 | 9 | 4 | 1 | 3 | 0 | 5 | 5 | 2 | 5 | 9 | 1 | 1 |
| 7 | 3 | 2 | 4 | 7 | 0 | 9 | 3 | 7 | 4 | 1 | 5 | 3 | 5 | 2 | 6 | 3 | 8 | 0 | 6 | 4 | 0 | 2 | 5 | 9 |
| 8 | 9 | 9 | 8 | 9 | 6 | 7 | 1 | 6 | 2 | 2 | 1 | 1 | 8 | 6 | 6 | 8 | 2 | 7 | 7 | 8 | 7 | 3 | 5 | 9 |
| 8 | 7 | 9 | 0 | 7 | 5 | 0 | 8 | 6 | 5 | 9 | 7 | 1 | 1 | 5 | 8 | 3 | 6 | 1 | 4 | 6 | 8 | 2 | 4 | 6 |
| 4 | 3 | 1 | 6 | 2 | 0 | 7 | 9 | 3 | 7 | 1 | 8 | 2 | 7 | 4 | 6 | 3 | 9 | 6 | 2 | 0 | 1 | 5 | 8 | 6 |

FIG. 6
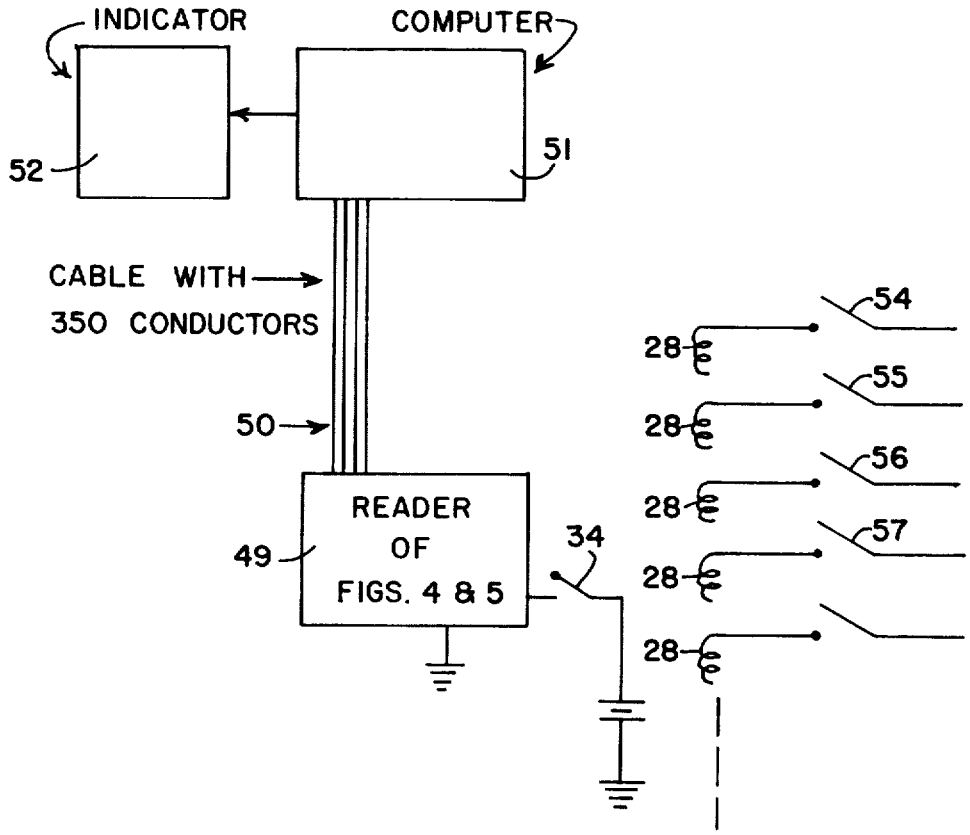
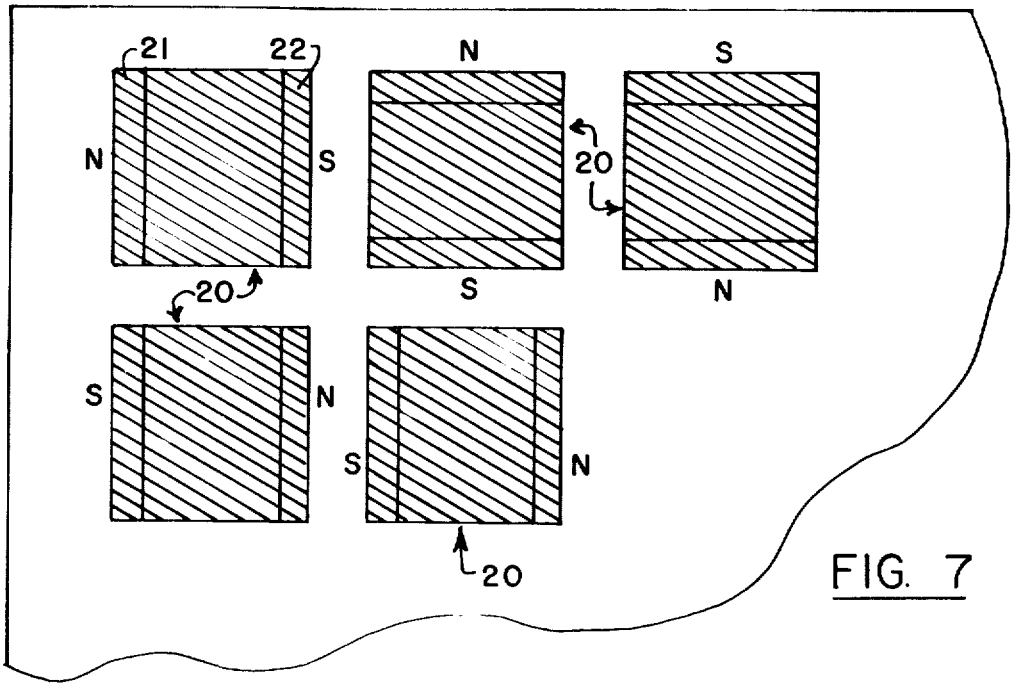
FIG. 7

MAGNETICALLY CODED IDENTIFICATION CARD

Matter enclosed in heavy brackets [ ] appears in the original patent but forms no part of this reissue specification; matter printed in italics indicates the additions made by reissue.

RELATED APPLICATIONS

*The present application is a reissue application of U.S. Pat. No. 4,253,017.*

This application is a continuation in part of my prior co-pending application, Ser. No. 487,757, filed July 11, 1974, entitled "Process for Preparing an Identification Card", which, in turn, is a continuation in part of my prior co-pending application, Ser. No. 431,803, filed Jan. 8, 1974, and entitled "Improved Identification Card", now abandoned, which, in turn, is a streamlined continuation of my application, Ser. No. 223,649, filed Feb. 4, 1972 entitled "Improved Identification Card", now abandoned. This application is also a continuation-in-part of my prior co-pending application, Ser. No. 601,778, filed Aug. 4, 1975, entitled: Improved Identification Card and Process for Preparing the Same.

BACKGROUND OF THE INVENTION

Identification cards have been the subject of considerable counterfeiting and it is highly desirable to provide one that it is difficult to counterfeit. Moreover, even an identification card which cannot be counterfeited, can be misused. For example, a person holding a valid passport or a valid permanent resident card, can send it to someone outside of the country who may use it for entry purposes, if the customs agent does not recognize that the user of the passport (or permanent resident card) is a different person from the person whose picture and/or signature appears on the passport. Therefore, it is desirable to have an identification card which indicates whether its last use was for ingress or egress to or from the country, and which gives other information intended to prevent misuse. My prior co-pending applications, referred to above were primarily addressed to the problem of providing an identification card that could not be counterfeited. The present invention is primarily directed to preventing misuse of that card although this invention also reduces the possibility of counterfeiting.

SUMMARY OF THE INVENTION it is an object of this invention to provide an identification card which has magnetic coding which can be changed at will from time to time to indicate whether the last use of the card was for egress or for ingress, the date of such egress or ingress, and the place thereof. When a person entering the country presents the card to a customs agent, he will immediately place it in a reading machine which will check the coding on the card (which is magnetically coded) against the computer's memory, to see if the card is valid, and he will also check to see if the last use of the card was for ingress or egress. Unless the last use of the card was for egress he would reject the person attempting to come into the country with the card.

The foregoing is accomplished by providing the card with a large number of spots each of which has two portions one of which is magnetized with one polarity and another of which is magnetized with the opposite polarity. A selected group of these spots is magnetized to represent the serial number of the card. Other groups represent other information.

Both fixed and variable information may be recorded in the above fashion. The serial number, and the expiration date, of the card remain the same throughout the life of the card and comprise "fixed" information. Some information may change from time to time such as the last port of entry or egress, and the last date of use; and this is "variable" information.

The data magnetically recorded on the card is read by a horseshoe-shaped soft-iron core, for each of said spots, the core receiving magnetic flux therethrough in one direction, or the opposite direction, depending upon which portion of the spot is north and which portion is south. By employing a "Hall effect" device, the magnetic flux is converted into a voltage which is positive when one portion of the spot is north and negative when that portion of the spot is south. The voltages representing each spot are fed to a computer which provides a reading of the magnetically coded information on the card.

The apparatus for reading the card may also be provided with means for changing the information recorded on the card. For example, the device is capable of erasing the data representing the last port of ingress or egress and replacing it with new data. This is done, after the card has been read and the computer displayed the information on the card, by energizing coils on the horseshoe magnets in the required manner to magnetize the spots, representing the last port of ingress or egress, to represent the port which is processing the card.

FIG. 1 is a top view of the identification card comprising my invention.

FIG. 2 shows the various laminations that are fused together to form the identification card of this invention.

FIG. 6 is a block diagram of the overall reader and coding device.

FIG. 7 illustrates a number of "spots" on the core and shows how they are magnetized.

DESCRIPTION OF PREFERRED EMBODIMENTS

Figures 3, 5:
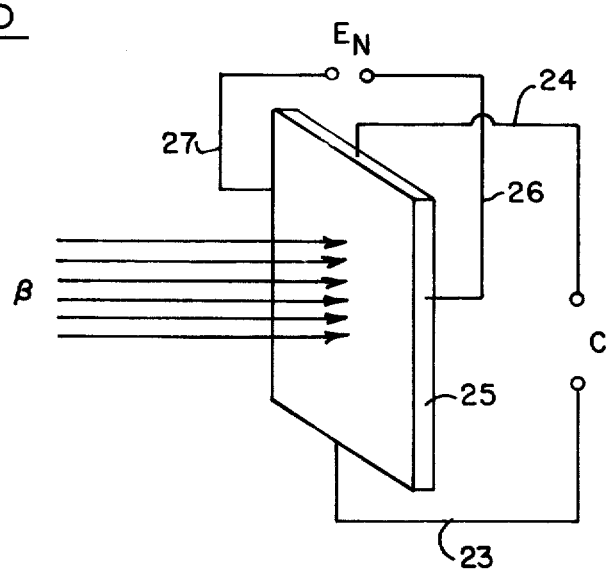
FIG. 3 shows the various coded spots on the core 10, and a designation of the numerical value of each spot.
FIG. 5 is a detailed view of the "Hall effect" device embodied as a part of FIG. 4 for converting the magnetic information on the horseshoe magnet into positive and negative voltages.

Referring to FIGS. 1 and 2, there is illustrated a passport identification card 1 embodying the teachings of the present invention. The core 10, which can be white vinyl coated magnetic steel, like the cobalt-vanadium-iron alloy called Vicalloy, has a "photograph record" 2 bearing an image or other desired record placed thereon in contact with and overlying the central portion of the core. Overlying the upper surface of the core 10 and the "photographic record" 2 is a transparent thermoplastic sheet 11 which bears a design marking and/or desired printed information. Sheet 11 bears on the underside thereof a number of different design markings 3, 4, 5, each bearing preferably of a different color. The printing 8, 9, on the upper surface of this same sheet must be in perfect register with the printing on the underside of the sheet when observed through the transparent thermoplastic sheet. That is the printing would be made up of two sets of lines, part on the upper surface of Sheet 11 (8 or 9) and part on the under side of Sheet 11 (3, 4, or 5) making a complete pattern when viewed through the transparent sheet.

The material used for forming the colored or multicolored marking designs 3, 4, 5, on the underside and designs 8, 9, on the upper surface of the transparent thermoplastic sheet 11 is one which has preferably a vinyl resin base for the ink pigments which is the same resin from which the transparent sheets are formed. These special inks are lithographed with high etched engraving plates and run through the lithographic press without the use of water in the fountain. The inks should have the characteristics of having a slightly lower softening point than the vinyl thermoplastic sheet 11 so that when heat and pressure of lamination are applied, the inks will run and very slightly bleed together resulting in an entirely different appearing contrast or tone than the original colors. This low softening point makes the ink printed on the underside of the thermoplastic sheet 11 flow easily into the white vinyl coating on the metal core 10.

Once thermoplastic sheets 12, 11 and 11', 12' are placed on each side of 10, forming what might be called a sandwich, the entire assembly is placed in a flat platen type of oil hydraulic press where suitable heat and pressure are applied to produce the unitary identification card 1 of my present invention. The preferred lamination process is to raise the pressure of the oil hydraulic ram to about 750–1000 psi against the sandwich at which time the electric heating elements within the platens are turned on, thereby, quickly raising the temperature of the platen, and the sandwich therebetween, to about 320° F. Just as soon as this temperature is reached, as indicated by a visual thermometer, the electric power is shut-off automatically and the thermoplastic, which is then in a sticky or molten state, is quickly cooled by a cold liquid (at zero temperature) which is automatically pumped through the platens under 150 psi. The thermoplastic sheet 11 while in the molten state and under high pressure thoroughly flows and mixes with the counterpart sheet 12 and the vinyl coating on core 10.

The design markings 4 and 5 are so positioned on sheet 11 that they overlie the "photographic record" 2. In this embodiment, a blank portion T' is provided in sheet 11 to allow the incorporation into the card of a thumbprint of the user of the card and to provide the clear visibility of the thumbprint through the thermoplastic sheets.

It is most advantageous to place the fingerprint on the underside of the sheet 11 so that the print is adjacent the upper surface of the core 10. Accordingly, it is possible to have the fingerprint ink flow into the coating of the upper surface of the core, when present, during lamination as will be discussed hereinafter. Moreover, when the sheet is put into position for lamination, the fingerprint image is twisted 180° as viewed through the front side of the card. This makes it extremely difficult to replace the fingerprint. In addition, it may be desirable to place an intricate overlay design on the sheet over the fingerprint area with invisible ink which only becomes visible when exposed to ultraviolet light for further protection against alteration.

Gold threads 6 are provided on the underside of sheet 11 so as to be in direct contact with the "photographic record" 2. Also illustrated in this embodiment is the incorporation of an additional protective transparent thermoplastic sheet 12 which is used to protect any printed or typed matter that may be on the upper surface of sheet 11. In addition to the protective nature of this additional sheet 12, it also eliminates the possibility of alternation of such matter. It is preferable that there be positioned the same number of thermoplastic sheets, of the same thickness, on each side of the core 10 to prevent curling.

As illustrated in the drawings, there is provided transparent thermoplastic sheet 11' on the opposite side of core 10, bearing identification information and/or design markings on the undersides thereof (the surfact nearest the core 10). Sheet 11', as illustrated herein, bears appropriate passport information 7' (such as the seal of the issuing department of government, passport number, and authorization for travel, etc.).

There is provided also on this opposite surface of the core 10 an outermost protective thermoplastic sheet 12'.

These various sheets when laminated together under heat and pressure provide a unitary identification card comprising a "photographic record" encased in a transparent material, having the outward three-dimensional appearance shown in FIG. 1, although the third-dimensional effect cannot be adequately depicted in the drawing.

FIG. 3 shows the position of various coded characters on the core 10.

Figure 4:
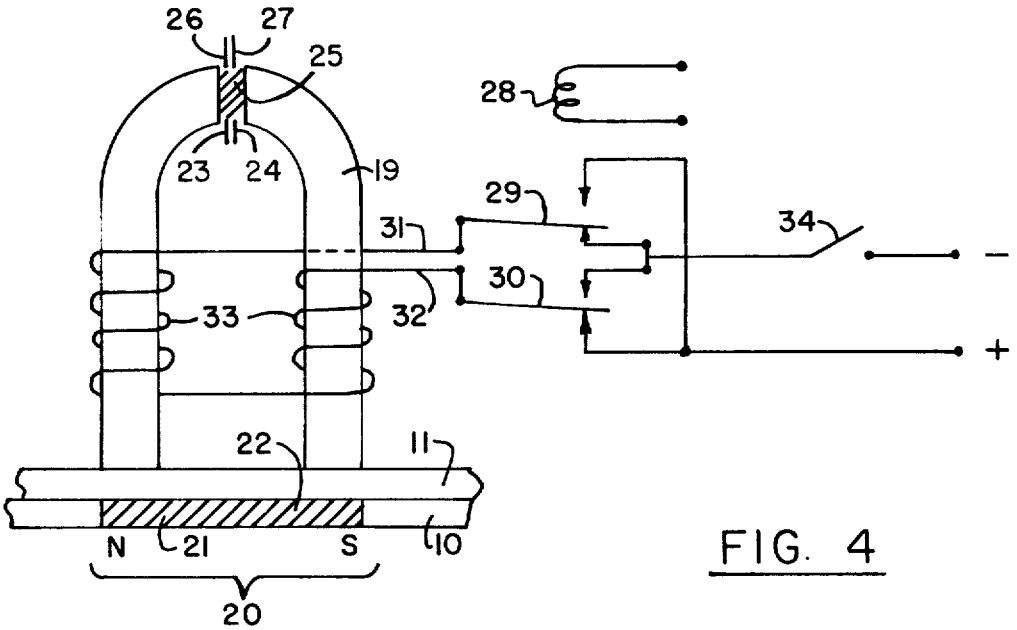
FIG. 4 illustrates the electrical apparatus that is placed on the card during the reading operation. This apparatus also is capable of changing the coding on the card.

FIG. 4 is a device for coding and reading one spot on the core 10.

The core 10 of FIG. 2 has 350 spots, each of which can be magnetized in one direction, and the other magnetized in the other direction. For example, in FIG. 4, the magnetic core 10 has a spot 20 which has two end portions 21 and 22. End portion 21 is the north pole of the magnetized spot 20 whereas portion 22 is the south pole. It must be remembered that in connection with each spot, such as 20, on the card, one of the magnetized portions is always magnetized in reverse polarity from the other.

It is understood that for each of the 350 spots of FIG. 3, there is a coding and reading device of FIG. 4 for that spot. The simplest function performed by the apparatus of FIG. 4 is to read the condition of the magnetized portions of a spot without changing the magnetization of those portions. To perform the simple reading function, a reading machine with 350 horseshoe cores 19, one for each of the 350 spots in FIG. 3 is provided. Each horseshoe core 19 is positioned so that one free end of the horseshoe core is adjacent one of the magnetic poles of its complementary spot, for example 21, and the other free end of the magnetic core is adjacent to the other magnetic pole such as 22, of the spot. The magnetized spots having poles such as 21 and 22 cause magnetic flux to pass through both the horseshoe core 19, and "Hall effect" device 25 (FIG. 5). A constant control current is passed via wires 23 and 24 into the plate 25. This is in accordance with the conventional "Hall effect" technology which has been known for a great many years. The wire 23 feeds the lower end of the plate 25 about midway along its length and the wire 24 feeds the upper end of plate 25, about midway along its length. If magnetic core 19 has only its residual magnetism, the amount of magnetic flux passing through conducting plate 25 via wires 23 and 24 and, therefore, the output $E_n$ will be minimal. If, however, portion 21 of spot 20 is magnetized so that it is the north pole of the spot 20 and portion 22 is magnetized so that it is the south pole, there will be sufficient flux in core 19 to apply field Beta ($\beta$), in a first direction, through the conducting plate 25. This will deflect the current passing through plate 25 from wires 23 and 24 and cause a potential difference to appear on the wires 26 and 27 and, thus, produce voltage $E_n$ which is positive. On the other hand, if the magnetic polarity of the spots 21 and 22 is reversed so that portion 21 is south and portion 22 is north, the flux $\beta$ will be in a second direction which is opposite to said first direction and the voltage $E_n$ will be negative. The voltage $E_n$ for each of the 350 spots on the core is fed to a computer 51 which determines the validity of the card, as will hereinafter appear.

In some cases, it is desirable to reverse the polarity of the portions, such as 21 and 22, of spots such as 20. For example, it is in some cases desirable to change the coding on the card in order to indicate a new date of use, or in order to indicate the last port of ingress or egress. It is also desirable to indicate whether the last use of the card was used for ingress or egress. All of these different operations will require full reversal of the magnetism of at least some of the portions, such as 21 and 22, of at least some of the spots such as 20. When it is desired to do this, the solenoid 28 is energized or deenergized, as the case may be, in order to get the desired polarities of portions such as 21 and 22. While the solenoid 28 is in its desired state of energization or deenerization, as the case may be, the switch 34 is momentarily closed. If solenoid 28 is energized, the armatures 29 and 30 are attracted upwardly and place a positive voltage on wire 31 and negative voltage on wire 32, thus, energizing coils 33 to produce flux in one direction, to produce sufficient magnetization of the portions 21 and 22 in the desired polarity. If, on the other hand, the solenoid 28 is deenergized the same events will happen except that all polarities will be reversed.

Referring now to FIG. 3, 80 of the 350 spots have been arbitrarily set aside to represent the serial number of the identification card. Of these 80 spots which are set aside to represent the serial number, seventy-two of them have the portion 21 (of the spot) south and the portion 22 (of the spot) north. The other eight spots have the opposite polarity of their portions of their spots. The eight selected spots, of the 80 spots, represent the serial number of the card and for purposes of illustration, for a representative case, have been enclosed in a circle in FIG. 3. Thus the eight digits of the serial number of the card in FIG. 3 would be 71342685. This would be verified when the card is submitted to a customs agent because he would put the card into a reading machine which would have a separate core 19 to read each one of the 80 spots. Seventy-two of the spots would produce voltages $E_n$ of negative polarity. The other eight spots would produce positive potentials at output $E_n$ of their reading device and the computer would detect this and assign the proper values to the respective spots, and thus reconstruct the serial number and check it for validity.

It is also desirable to have the expiration date of the card set forth in the coded information. Therefore, 50 of the 350 spots are set aside for the expiration date. Forty-five of these 50 spots would in the case of each expiration date have portions such as 21 and 22 so polarized, for each of the 45 spots, that negative voltages would be produced at $E_n$ for these 45 spots, but there would be 5 of the 50 spots where the polarities would be opposite to those involved in the other 45 spots and they would indicate the expiration date of the card. Those 5 spots are enclosed in squares on FIG. 3 and, therefore, the expiration date of the card of FIG. 3, would be 25314. The computer would detect which one of the 5 spots, of the available 50, had positive polarities at $E_n$ and would then determine the expiration date from the digits assigned to the 5 spots.

Of the 350 spots, thirty are set aside to indicate the last port of ingress or egress, where the card was used. Of these thirty spots, three are selected to represent a given port. Each port would have thirty solenoids 28 together with thirty circuits such as 29–33, which could be used to change the polarity of the thirty spots representing the port of entry. Each port of entry, therefore, has twenty-seven solenoids 28 that will magnetize twenty seven of the thirty spots, that have been set aside to represent ports of entry, in one particular way so that these twenty seven spots will produce negative voltages $E_n$. The other three spots will have the solenoid 28 in the opposite state of enerization, or deenerization, from that of the other twenty-seven spots, and will magnetize three spots which will correctly represent that port of entry. Actually, however, each port of entry would have two particular codes that it could apply to an identification card, one of which it would apply to represent that the card holder left the country via that port and the other to indicate that the card holder entered the country by that port. The port of entry would also have suitable solenoids 28 together with switches and wires 34 and elements 29–33 to represent the date of last use of the card. Fifty spots are set aside to represent the date of last use of the card. All dates are coded so that among the fifty spots any particular date can be represented by energizing, with proper polarity, only five spots. The magnetism which selects which ones of the solenoids 28 are energized is, therefore, changed each day so that the particular solenoids are energized which will correctly magnetize the five spots required to indicate the proper date. The other forty-five spots, reserved for indicating the date, are, of course, subjected to a magnetic field, but in the opposite direction from the five spots that were represented to select the date.

Therefore, at each port of entry, when the card is presented to the customs agent, he will first place it into the reading machine which will read all of the information on the card such as the serial number, the expiration date, the place where the card was last used, and the date of last use. The computer will tell him whether the serial number is valid, whether the card has expired, and will indicate to him the place and date of last use. After the customs agent has seen for himself that the holder of the identification card is entitled to enter the country, he will then press the necessary button for that day to energize the proper solenoids to remagnetize the thirty spots representing the place where the card was used, to thus imprint in those thirty spots the identification of the port of entry and at the same time the device will remagnetize the fifty spots relating to the date of use so that five of these are magnetized in such a manner as to indicate the date on which the operation is taking place.

While I have shown the card with 350 spots, set up to have a particular digital value assigned to each of the 350 spots, so that the polarization of the magnets of that spot, in a particular manner, will give an output having a value equal to the digital value of that spot, it is also possible to use other means for placing values on the various permutations and combinations of spots used to represent particular data.

For example, instead of using the digital system shown in FIG. 3, the eighty spots that are set aside for the serial number could be magnetized according to the binary system to thus indicate the serial number. Similarly, the fifty spots set aside for the expiration date could be magnetized according to the binary system to represent the expiration date. Similarly, the apparatus 28–33 could easily be designed so that the port of ingress or egress, as the case may be, would be identified, according to the binary system by the thirty spots that are set aside for that purpose and the date of the card would be represented by the thirty spots, magnetized in accordance with the binary system.

With the binary system, usual techniques could be employed; for example, as shown in FIG. 4. If portion 21 is the north pole and portion 22 is at the south pole, the spot would represent binary 0. On the other hand, if the portion 21 is the south pole, and the portion 22 is the north pole, the spot would represent binary 1.

By thus coding the 350 spots according to binary numbers 0 and 1 all of the various data described above could be recorded on the card, and the place where the card is used, as well as whether it was used for ingress or egress, and the date of last use of the card, could be changed, as desired, simply by setting in advance, each day, which ones of solenoids 28 would be energized and which ones would be deenergized.

FIG. 5 illustrates the overall reading and recording apparatus to be used at the port of entry. There are a series of solenoids 28, one for each spot on the identification card. As explained in connection with FIGS. 3 and 4, these solenoids respectively control the polarity of magnetization of the two portions of each spot. The apparatus of FIGS. 3 and 4, of course, shows apparatus controlling the magnetization of only one spot 20. The reader 49, however, comprises 350 devices such as are shown in FIGS. 3 and 4, (except for the solenoids which are shown separately in FIG. 5). The reader 49, therefore, has 350 outputs $E_n$, these being transmitted by a cable 50 to general purpose computer 51. The general purpose computer feeds an indicator 52. At the beginning of the day, the customs agent may correctly set simple switches 54–57 so that the data fed magnetically into the card will be the correct data for that day.

In FIG. 7 there is shown how the 350 magnetized spots may be applied to the core 10. It is clear that the size of the spots must be adequate to provide the necessary flux for horseshoe core 19. In a typical case spots one-eighth inch square are adequate. Moreover, the spots 20 must be spaced apart to a sufficient extent to avoid undue interference (cross-talk). Spacing greater than 0.04 inches is preferable. However, the dimensions may vary somewhat with the material and thickness of core 10 and the thickness of plastic covering 11 of the card.

I claim to have invented:

1. Apparatus for reading an identification card having a core capable of being permanently magnetized to provide multiplicity of bits of information, said bits being arranged in columns and rows, which core has a spot for each bit of information with each spot being magnetized along its length to provide spaced opposing magnetic poles comprising:

reading means for reading all of said bits of information simultaneously, said reading means having for each bit to be read:

(a) magnetic means having first and second ends adjacent said opposing poles respectively so that magnetic flux passes through said magnetic means, (b) flux responsive means, cooperating with said magnetic means, responsive to the direction that magnetic flux is passing through said magnetic means, and (c) means for selectively applying magnetic flux to said magnetic means to effect predetermined magnetization of the portion of the core on which the bit of information is recorded.

2. Apparatus as defined in claim 1 including means connected to said flux responsive means for developing the information recorded by said [plurality of] bits.

3. Apparatus as defined in claim 1 including means for applying sufficient magnetic flux to at least one of said magnetic means to reverse the magnetism of the portions of the core comprising a bit of information.

4. Apparatus as defined in claim 1 including means for selectively applying sufficient magnetic flux to some of said magnetic means to reverse the polarities of the portions of the core representing selected bits.

5. Apparatus as defined in claim 1 in which said flux responsive means is a "Hall effect" device.

6. Apparatus as defined in claim 1 including means connected to said flux responsive means for indicating the information recorded by said [plurality of] bits.

*7. Apparatus for reading an identification card having a core capable of being permanently magnetized to provide multiplicity of bits of information, said bits being arranged in at least one row, which core has a spot for each bit of information with each spot being magnetized along its length to provide spaced opposing magnetic poles comprising:*

*reading means for reading said bits of information simultaneously,*

*said reading means having for a plurality of the bits to be read:*

*(a) magnetic means having first and second ends adjacent said opposing poles respectively so that magnetic flux passes through said magnetic means,*

*(b) flux responsive means, cooperating with said magnetic means, responsive to the direction that magnetic flux is passing through said magnetic means, and*

*(c) means for selectively applying magnetic flux to said magnetic means to effect predetermined magnetization of the portion of the core on which the bit of information is recorded.*

*8. Apparatus as defined in claim 7 including means connected to said flux responsive means for developing the information recorded by said plurality of bits.*

*9. Apparatus as defined in claim 7 including means for applying sufficient magnetic flux to at least one of said magnetic means to reverse the magnetism of the portions of the core comprising a bit of information.*

*10. Apparatus as defined in claim 7 including means for selectively applying sufficient magnetic flux to some of said magnetic means to reverse the polarities of the portions of the core representing selected bits.*

*11. Apparatus as defined in claim 7 in which said flux responsive means is a "Hall effect" device.*

*12. Apparatus as defined in claim 7 including means connected to said flux responsive means for indicating the information recorded by said plurality of bits.*

* * * * *